United States Patent
Lu et al.

(10) Patent No.: US 12,077,649 B2
(45) Date of Patent: Sep. 3, 2024

(54) MALONATES AND DERIVATIVES FOR IN-SITU FILMS

(71) Applicant: Zephyros, Inc., Romeo, MI (US)

(72) Inventors: Yuan Lu, Romeo, MI (US); Kenneth Mazich, Romeo, MI (US); Kevin Hicks, Romeo, MI (US); Austin O'connor, Romeo, MI (US); Michael Czaplicki, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 467 days.

(21) Appl. No.: 17/328,909

(22) Filed: May 24, 2021

(65) Prior Publication Data

US 2021/0277200 A1 Sep. 9, 2021

Related U.S. Application Data

(63) Continuation of application No. 16/092,230, filed as application No. PCT/US2017/028853 on Apr. 21, 2017, now Pat. No. 11,015,034.

(60) Provisional application No. 62/396,435, filed on Sep. 19, 2016, provisional application No. 62/395,012, filed on Sep. 15, 2016, provisional application No. 62/325,818, filed on Apr. 21, 2016.

(51) Int. Cl.
| | | |
|---|---|---|
| *C08J 9/224* | (2006.01) | |
| *C09J 4/00* | (2006.01) | |
| *C09J 7/35* | (2018.01) | |
| *C09J 7/38* | (2018.01) | |
| *C08K 5/07* | (2006.01) | |

(52) U.S. Cl.
CPC ............ *C08J 9/224* (2013.01); *C09J 4/00* (2013.01); *C09J 7/35* (2018.01); *C09J 7/381* (2018.01); *C08J 2323/08* (2013.01); *C08J 2363/00* (2013.01); *C08K 5/07* (2013.01); *C09J 2301/408* (2020.08); *C09J 2400/163* (2013.01)

(58) Field of Classification Search
CPC .... C08J 9/224; C08J 2323/08; C08J 2363/00; C09J 4/00; C09J 7/35; C09J 7/381; C09J 2301/408; C09J 2400/163; C08K 5/07
See application file for complete search history.

(56) References Cited

U.S. PATENT DOCUMENTS

| 4,160,864 | A | * | 7/1979 | Ponticello | .............. C09J 4/00 526/322 |
| 4,694,093 | A | | 9/1987 | Sugimori et al. | |
| 8,609,885 | B2 | | 12/2013 | Malofsky et al. | |
| 8,884,051 | B2 | | 11/2014 | Malofsky et al. | |
| 9,181,365 | B2 | | 11/2015 | Malofsky | |
| 9,217,098 | B1 | * | 12/2015 | Stevenson | ............. C08F 2/58 |
| 2003/0031499 | A1 | | 2/2003 | Heard et al. | |
| 2014/0329980 | A1 | | 11/2014 | Malofsky et al. | |
| 2015/0056879 | A1 | | 2/2015 | Malofsky | |
| 2015/0073110 | A1 | * | 3/2015 | Malofsky | ............. C08F 2/38 526/204 |
| 2016/0073110 | A1 | | 3/2016 | Kim | |

FOREIGN PATENT DOCUMENTS

| EP | 2993211 A1 | 3/2016 |
| WO | 2013/149165 A1 | 10/2013 |
| WO | 2013/149168 A1 | 10/2013 |
| WO | 2014/078689 A1 | 5/2014 |

OTHER PUBLICATIONS

Anonymous: Registration Dossier—ECHA Diethyl Methylmalonate, Jan. 10, 2017, pp. 1-3, XP093058434, Retrieved from the Internet: URL:https://echa.europa.eu/registration-dossier/-/registered-dossier:18586/1/1# [retrieved on Jun. 27, 2023].
European Communication dated Jul. 3, 2023, Application No. 17723186.7.
PCT Search Report & Written Opinion dated Nov. 6, 2017, Application No. PCT/US2017/052254.
PCT Search Report & Written Opinion dated Sep. 27, 2018, Application No. PCT/US2017/028853.
India First Examination Report dated Sep. 18, 2020, Application No. 201837038796.
First Chinese Office Action dated Dec. 3, 2020, Application No. 201780038532.6.
Chinese Decision of Rejection dated Jan. 6, 2022, Application No. 201780038532.6.

* cited by examiner

*Primary Examiner* — Daniel H Lee
(74) *Attorney, Agent, or Firm* — The Dobrusin Law Firm, PC

(57) ABSTRACT

The present teachings contemplate a method comprising coating an polymeric material with a composition including a dicarbonyl compound and having a viscosity of from about 50 cps to about 500 cps, wherein the coating initiates either: (i) spontaneous polymerization (e.g., in less than about one minute) at room temperature of the composition without the addition of an initiator; or (ii) polymerization at room temperature at a selected later time with or without the addition of an initiator; and wherein the composition adheres or facilitates adhesion of the polymeric material to a substrate.

20 Claims, No Drawings

MALONATES AND DERIVATIVES FOR IN-SITU FILMS

TECHNICAL FIELD

The present invention relates generally to malonate coatings, films or similar treatments that allow for easily controlled polymerization.

BACKGROUND

In the transportation and construction industries, among others, polymeric adhesives, sealants and foams are frequently used to provide structural support, sealing, and sound attenuation. Coatings, handling films, or the like (referred to herein generally as coatings) are frequently utilized in conjunction with such materials. However, many such coatings or even the adhesives, sealants or foams themselves present significant challenges in adhering to certain substrates, especially substrates that may be coated with contaminates such as oil. Furthermore, many existing coatings require the addition of an initiating substance or environment in order to polymerize and adhere during application to a substrate U.S. Pat. Nos. 8,609,885; 8,884,051; and 9,181,365 and U.S. Publication Nos. 2014/0329980 and 2015/0056879 may be relevant to the present teachings, and are all incorporated by reference for all purposes.

Notwithstanding the above teachings, there has remained a need for coatings that are capable of polymerization at room temperature upon contact with certain substrates without need for any initiator. There is a further need for coatings that are capable of adhering to substrates that typically present challenges in adhesion, especially contaminated substrates.

SUMMARY OF THE INVENTION

One or more of the above needs are met by the present teachings which contemplate a method comprising coating a material with a composition including a dicarbonyl compound represented by the formula

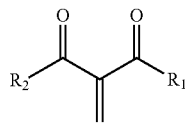

the composition having a viscosity of from about 50 cps to about 500 cps, wherein the coating process initiates either: (i) spontaneous polymerization (e.g., in less than about one minute) at room temperature of the composition without the addition of an initiator; or (ii) polymerization at room temperature at a selected later time with or without the addition of an initiator; and wherein the composition assists in adhering the coated material to a substrate (e.g., by permitting penetration of the material through the coating to the substrate).

The material which receives the coating may be a polymeric material. The material may be an expandable material. The substrate to which the coated material is adhered may be a metallic material. The substrate may be a contaminated substrate (e.g., coated in oil or the like). The substrate may be a polycarbonate material. One or more of the substrate and material may be nucleophilic. The substrate and/or material may have a pH of greater than 7. The coating step may comprise applying the composition to the material as a film. The coating step may include spray coating, roll coating, brushing, dipping or any combination thereof. The composition may form a handling film. Polymerization of the composition may occur at least 5 minutes, at least 15 minutes or even at least 30 minutes after coating. Polymerization of the composition may occur less than 1 hour, less than 30 minutes, less than 15 minutes, or even less than 5 minutes after coating. The substrate may be a sheet molding compound (SMC) material. The composition may be stored in a container comprising one or more materials having a neutral pH (e.g., a pH of less than 7). The composition may be formed as a paste. The composition may include a colorant. One or more of the material and/or substrate may be formed with a bisphenol A precursor. The method may include welding the material after coating. The coated material may be a tape. The tape may include a first surface containing a pressure sensitive adhesive. The tape may include a surface that is a heat activated adhesive. The coated material may form a laminate when applied to the substrate. The composition may be formed for locating into a glue gun application device. The composition may be stored in a polyethylene container. The substrate may be concrete. The substrate may be coated with an oil-based substance. The oil-based substance may be 61 MAL HCL 1. The coating may form a tack-free surface on the material. The method may include heating the coated material on the substrate to cause adhesion of the composition and/or material to the substrate. The material may be a tacky material. The material may be a tack-free material. The material may be an epoxy-containing material. The material may include an ethylene copolymer. The composition may include one or more of a diethyl (e.g., diethyl methylmalonate), dimethyl, hexyl methyl, ethyl ethoxy ethyl, ethyl cyclohexyl, 2-phenylpropyl ethyl, dicyclohexyl, and fenchyl methyl.

The material may be a structural adhesive. The composition may increase dimensional stability of the adhesive. A reinforcing layer may be added to the material and composition so that the reinforcing layer is: (i) located on the surface of the material; (ii) located within (e.g., substantially surrounded by) the material; (iii) formed as a bead of extruded material; or (iv) any combination thereof. A reinforcing layer may be added to the material and composition and the reinforcing layer may comprise a scrim, a yarn, a fiber, a bead of solid epoxy-containing material, a weave, fibers (e.g., glass, carbon, Kevlar or the like), a mesh, or any combination thereof. One or more of the material or composition may include a thermoplastic epoxy component. A reinforcing layer may be added to the material and composition and the reinforcing layer may be a recyclable material. The material may be selected from a sealant, and adhesive, a patch, a tape, or any combination thereof. The composition and material may be reprocessed (e.g., recyclable) without property degradation of the material. The material may penetrate the composition and adhere to the underlying substrate. The coating may improve the handling of the material. The coating may improve the adhesion of the underlying material. The coating may improve the weldability of the material. The weldability may be improved by the composition modifying one or more physical characteristics of the material to which it is applied. The weldability may be improved by modifying the one or more of the rheology and/or surface characteristics of the material by use of the coating.

The teachings herein further provide for a structure comprising a polymeric material, a composition including a dicarbonyl compound represented by the formula

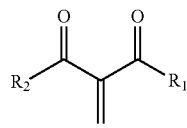

coated located onto the polymeric material and a substrate having a pH of greater than 7 located in contact with the composition.

The teachings herein also provide for a method comprising coating n polymeric material with a composition including a dicarbonyl compound represented by the formula

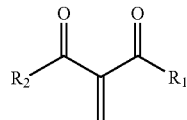

and having a viscosity of from about 50 cps to about 500 cps, wherein the coating polymerizes upon the addition of an initiator and wherein the composition adheres the polymeric material to a substrate and/or the polymeric material penetrates the composition to adhere to the substrate.

The present teachings further contemplate a device comprising an expandable material, an open mesh weave located in planar contact with the expandable material and along the entirety of the expandable material, and a malonate handling film applied to at least a portion of open mesh/expandable material assembly. The expandable material may be tacky prior to expansion allowing the expandable material to adhere to the open mesh weave. It also may allow, prior to expansion, adhesion to a surface for reinforcing the surface, at least in desired areas, but with allowing efficiently and effectively handling from the manufacturing line of the device, to the installation in the vehicle.

The device may be configured to conform to the shape of the surface. The device may be flexible (e.g., capable of easily bending without breaking) prior to expansion of the expandable material. The device may bend under its own weight when held at its end. The volumetric activation of the activatable material may be at least about 100% and less than about 300%. The expandable material may include a structural adhesive material. The expandable material may include a sealant material.

The present teachings further contemplate a method for structurally reinforcing a vehicle body stamping comprising forming a tacky expandable structural adhesive material and locating an open mesh material onto the expandable material. The method may further include applying a handling coating to all or part of the open mesh/expandable material assembly. The coating may comprise a malonate composition which may be a malonate film. The method may further include contacting the open mesh and expandable material with a vehicle body stamping surface and activating the expandable material to expand by application of heat. The open mesh and expandable material may remain in contact with the stamping surface by means of the tacky nature of the expandable material in a portion not covered by the handling coating or via another attachment method, prior to activating the expandable material.

The method may be free of any separate fastening step for connecting the reinforcement member to the body stamping. The method may include a separate fastening step for connecting the reinforcement member to the body stamping. The method may include flexing the expandable material and mesh to conform to the shape of the body stamping prior to activating the expandable material. The method may include cutting the expandable material to a desired shape prior to locating the mesh onto the expandable material. The method may include cutting the expandable material and mesh located thereon to a desired shape prior to contacting the mesh and expandable material with the vehicle body stamping surface. The step of forming the tacky expandable structural adhesive material may be free of any molding process. The step of locating the mesh onto the expandable material may be free of any separate fastening step for connecting the mesh to the expandable material. The step of activating the expandable material includes volumetric expansion of at least about 100% and less than about 300%. The method may include flexing the expandable material and mesh so that a first portion of the mesh and expandable material is arranged at an angle of 90° or less from a second portion of the mesh and expandable material. The method may include flexing the expandable material and mesh so that a surface of the vehicle body stamping is contacted by the mesh and expandable material that would not be contacted by the mesh and expandable material if the mesh and expandable material were substantially rigid. The mesh may be located onto the expandable material so that the expandable material substantially covers the mesh and is free of any voids on the mesh that are not covered with the expandable material prior to activation. The open mesh and expandable material may no longer be flexible after activation of the expandable material. The open mesh and expandable material may continue to be flexible after activation of the expandable material.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the priority date of U.S. Provisional Application Ser. No. 62/325,818, filed on Apr. 21, 2016; 62/396,435, filed on Sep. 19, 2016; and 62/395,012, filed on Sep. 15, 2016. The entirety of these applications are hereby incorporated by reference for all purposes.

The present teachings contemplate the use of a malonate-based composition (e.g., a monomeric composition) for coating (e.g., applying as film to) a secondary material (which may be a polymeric material). Any reference herein to the material to which the coating is applied may be referring to the material in its unactivated (e.g. uncured or green) state or in its activated (e.g., cured) state. The composition may preferably comprise a diethyl malonate (DEM). The composition may comprise a dimethyl malonate (DMM). The composition may preferably comprise a diethyl methylmalonate (DEMM). The composition may include one or more additional components which may be selected from adhesion promoters and initiators. The composition may include a cyanoacrylate (e.g., methyl 2-cyanoacrylate, ethyl-2-cyanoacrylate, n-butylcyanoacrylate and 2-octylcyanoacrylate). The composition may include one or more of a diethyl, dimethyl, hexyl methyl, ethyl ethoxy ethyl, ethyl cyclohexyl, 2-phenylpropyl ethyl, dicyclohexyl, and fenchyl methyl.

The malonate composition may be a one part material that polymerizes either immediately or at some later designated time at room temperature (e.g., at a temperature of from about 20° C. to about 25° C.). It is also possible that some heat may be utilized for polymerization. It is quite possible that the malonate composition polymerizes at room temperature without the addition of any initiator or stimulus. However, it is also possible that an initiator or stimulus may be utilized to cause polymerization of the composition. Suitable stimuli includes but are not limited to ultra-violet light. The composition may be such that the time of polymerization can be modified so that it is "on demand". In other words, the composition can be applied as a coating (e.g. as a film) to a secondary material to provide sufficient open time for application of the coating with no polymerization such that the composition does not polymerize until contact with a substrate of choice. Thus, open time for the application process can extend a number of minutes or even an hour without fear of early polymerization. It is possible that only contact with certain substrates initiates polymerization of the composition.

The teachings herein are also directed to a method whereby a material that has one or more characteristics that make it difficult to handle (e.g., that the material is tacky, that it is subject to sag, that the viscosity is lower than desired, that the surface energy is lower than desired) is coated with a composition to assist in ameliorating one or more of these characteristics. The surface of the material that receives the coating may then be located onto a substrate. The substrate may be a material that is typically difficult to adhere to, whether by the physical characteristics of the substrate itself, or the presence of a treatment (e.g., oil) that presents challenges for adhering. The properties of the substrate may be selected such that upon contact with the material the composition polymerizes. However, it is also possible that the composition polymerizes upon contact with the substrate. It is possible that the composition remains as a layer between the material and the substrate. It is possible that the composition improves adhesion between the material and the substrate. It is possible that the material permeates the composition coating to adhere directly to the substrate. It is possible that only the composition adheres to the substrate. The material may be an activatable material such that upon coating the material with the composition, the material is in its unactivated or "green" state. Thus, despite the fact that the material adheres sufficiently upon activation, the composition may assist in adhering the material to the substrate prior to activation.

At some later time, after applying the coated material to a substrate, the material may be activated by the addition of a stimulus. The stimulus may be a physical stimulus or chemical stimulus. The material may be activated by the addition of heat. Upon activation, the material may expand and/or otherwise cure forming a more rigid material that is generally dry to the touch, but may possibly remain tacky.

The coating may provide one or more of the following benefits. The coating may form a tack-free surface on an otherwise tacky material. The coating may adhere the secondary material to a substrate. The coating may be such that the secondary material may permeate the coating so that the secondary material adheres to the substrate. The coating may undergo polymerization at room temperature with no additional initiator or stimulus. The coating may allow for de-bonding of the secondary material from a substrate. The coating may provide sufficient adhesion of the secondary material to substrates which are generally difficult to adhere to. The coating may provide sufficient adhesion to contaminated surfaces such as those coated in oil-based substances. The coating may improve the weldability of a material to which the coating is applied. The coating may improve tack and/or adhesion. The coating may allow for the addition of a color or other appearance attribute. The coating may improve the energy absorption of a material to which the coating is applied. The coating may improve the reflectivity of a surface to which it is applied. The coating may improve the tactile safety of a surface to which the coating is applied. The coating may assist in minimizing abrasion of the material. The coating may act to absorb one or more contaminants present on one or more of the material, the substrate or both. The coating may be a formulation that facilitates simplified reprocessing. For example, the underlying material may be easily recycled or reprocessed with the coating still located thereon with minimal or no degradation to the material.

As mentioned, the composition may be applied to a secondary polymeric material. Immediate polymerization at room temperature may occur when the coated polymeric material is applied to the secondary material. Polymerization may occur only upon contact of the composition with a substrate (after application of the composition to the secondary material). It is also possible that that the composition may polymerize via electropolymerization, mechanically initiated polymerization, dual cure polymerization, thermally initiated polymerization, coordination polymerization, or nucleophilic polymerization. The composition may undergo solution or emulsion polymerization. It is also possible that the composition undergoes random copolymerization or block copolymerization. The composition may undergo anionic polymerization. The composition may undergo free radical polymerization.

When selecting the composition to utilize as a coating for a polymeric material, one or more of glass transition temperature (Tg), flexibility, reactivity, toughness, adhesion capability, rigidity, speed of reactivity or heat resistance may provide motivation for such selection. The coating may preferably be a malonate material. As a non-limiting example, a diethyl material may provide rapid reactivity. A dimethyl material may provide high reactivity. A hexyl methyl material may provide flexibility and toughness. An ethyl ethoxy ethyl material may provide improved adhesion and flexibility. An ethyl cyclohexyl material may provide rigidity, stiffness and rapid reactivity. A 2-phenylpropyl ethyl material may provide stiffness and improved adhesion. A dicyclohexyl material may provide a high Tg, stiffness and heat resistance. A fenchyl methyl material may provide high Tg, high rigidity, slow reactivity and heat resistance. Accordingly, depending on the intended use of the secondary polymeric material and the intended substrate upon which the polymeric material may be located, it is possible to select a coating which provides attributes which will benefit the intended use.

Polymeric materials coated with the compositions taught herein may have improved properties as compared to the polymeric materials with no coating. The coated polymeric materials may have improved mechanical properties such as increased tensile strength, improved modulus, improved hardness, increase impact strength, increased UV stability and improved crystallinity. The coated polymeric materials may have improved barrier capabilities against oxygen, carbon dioxide, water and other substances. The coated polymeric materials may have improved rheology, ductility and elasticity. The coated polymeric materials may have improved thermal characteristics and higher heat distortion temperatures. The coated polymeric materials may have improved electrical properties, improved optical properties, and improved thermodynamic properties. The coating may modify the surface energy of the polymeric material and improve wetting and adhesion. The thermodynamic nature and surface energy characteristics of the coating compositions may account for the ability of the compositions to adhere to oily substrates.

It is possible that contact between the coating composition and certain substrates may cause polymerization of the coating compositions. Certain basic substrates (e.g., those having a pH of greater than 7) may cause polymerization (and thus possibly adhesion) of the coating composition, which may thus adhere the secondary polymeric material to the substrate. It is also possible that acidic substrates (e.g., those having a pH of less than 7) may not cause polymerization of the coating composition. However, the coating may be utilized in systems having materials and/or substrates with pH of lower than 7, but an initiator may be required for the coating to polymerize. It is also possible that the more basic a substrate (the higher the pH) the more quickly the coating composition will polymerize. Thus, acidic materials may be included in the system to slow polymerization if so desired. Nucleophilic substrates may also initiate polymerization of the coating composition. It is possible that increased nucleophilicity will initiate polymerization more quickly. Some examples of substrates which act to initiate polymerization of the coating compositions disclosed herein include polycarbonate, SMC, Kevlar, concrete or other basic substrates. Some examples of substrates where the coating compositions may not polymerize, thereby possibly requiring an initiator or stimulus, include polyethylene, polypropylene and Teflon.

The coating compositions may be utilized in the formation of tapes (which may be pressure sensitive), or any material requiring differential tack. The coating compositions may be utilized to form weldable materials. The adhesion capability of the coating compositions may be modified by raising the molecular weight of the coating composition. Adhesion may occur upon initiation but may also be delayed post-initiation.

The material to which the coating is applied may be at least partially tacky at room temperature (e.g., about 23° C.) and may also be tacky at temperatures between about 0° C. and about 80° C. Additionally, the material preferably exhibits reinforcement characteristics (e.g., imparts rigidity, stiffness, strength or a combination thereof to a member) upon cure when located onto a substrate. It is also preferable for the material to be heat activated to expand or otherwise activate and wet surfaces which the material contacts. After expansion or activation, the material preferably cures, hardens and adheres to the surfaces that it contacts. For application purposes, it is often preferable that the material exhibit flexibility, particularly when the material is to be applied to a contoured surface of a vehicle body. Once applied, however, it is typically preferable for the material to be activatable to soften, expand (e.g., foam), cure, harden or a combination thereof. For example, and without limitation, a typical material will include a polymeric material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the material may be initially processed as a flowable material before curing. Thereafter, the base material preferably cross-links upon curing, which makes the material substantially incapable of further flow.

The material may be an epoxy-based material which may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Examples of suitable epoxy-based materials, which may be used as in the base material are sold under the product designations L5020, L5010, L5224, L8000, L5001 and are commercially available from L&L Products, Romeo, Mich. According to preferred formulations, the base material can include up to about 50% by weight epoxy resins, more preferably, up to about 65% by weight epoxy resins, and even more preferably up to about 80% by weight epoxy resins.

A substantial portion of the materials in the material will typically have molecular weights that are low enough to maintain adhesive capability of the base material. For an elastomer-based or epoxy-based base material, it is preferable for at least about 5% by weight of the elastomer or epoxy materials to have a molecular weight less than about 1000 and more preferably at least about 10% by weight of the elastomer or epoxy materials have a molecular weight less than about 1000. It is also contemplated that, for maintaining adhesive capability, components such as plasticizers or processing oils may be added to elastomer-based or epoxy-based materials and particularly to a thermoplastic-based material.

As general guidance for the material which receives the coating, it is preferable that at least 1% by weight of the components have a low enough molecular weight to be a liquid at about 23° C. More preferably, at least 5% by weight of the components have a low enough molecular weight to be a liquid at about 23° C. Still more preferably, at least 10% by weight of the components have a low enough molecular weight to be a liquid at about 23° C.

In most applications, it is undesirable for the underlying material itself be reactive at room temperature or otherwise at the ambient temperature in a manufacturing environment (e.g. up to about 40° C. or higher). More typically, the material becomes reactive at higher processing temperatures, such as those encountered in an automobile assembly plant. In such and embodiment, the material may be foamed upon automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the base material to cause expansion at different temperatures outside the above ranges. Generally, suitable materials or foams for the material have a range of expansion ranging from approximately 0 to over 1000 percent.

Advantageously, the material of the present invention may be formed or otherwise processed in a variety of ways. For example, preferred materials can be processed by injection molding, extrusion, compression molding or with a robotically controlled extruder such as a mini-applicator. This enables the formation and creation of part designs that exceed the capability of most prior art materials.

In the event that the system described herein includes a reinforcing material, it may be an open mesh reinforcing material. The open mesh material of the present invention is at least partially open or has through-holes. It is contemplated that it may be advantageous to allow a significant portion of the underlying material to flow through the open portion and adhere to the vehicle structure that is opposite the open mesh layer. In a preferred embodiment, the open portion is at least about 25 percent of the area of layer 14, more preferably at least about 40 percent, and most preferably at least about 50 percent, but less than about 90 percent. It is contemplated that the amount of area of the open portion be as high as possible while allowing the complete assembly to maintain its desired structural performance and physical properties.

The reinforcing material located onto the underlying material receiving the coating may include non-conductive threads or wire (e.g., elongated filament, fibrous, or fabric material), which may be applied as a mat, a cloth, a roving, a netting, a mesh, a scrim, or the like. In such embodiments, the strengthening material may be composed, for example, of woven or unwoven fibers, filaments or the like of cotton, glass (e.g., E-glass or S-glass), fiberglass, Mylar, nylon, polyester, carbon, aramid, plastics, polymers (e.g., thermoplastics such as polyamides (e.g., nylon), PET (e.g., Mylar), polycarbonate, polyethylene, polypropylene, polybutylene (e.g., polybutylene terephthalate), polystyrene, polyurethane, vinyl, or any combination thereof, or other materials. As used herein, "threads," or "wire" connotes a single filament of material, a braided bundle of filaments, or an unbraided bundle of filaments.

In other applications, it may appreciable that the reinforcing material may be bead-like particles, aggregates, hollow material (e.g., hollow particle), or otherwise, or any combination thereof. In such embodiments, the strengthening material may be composed, for example, of particles or the like of glass (e.g., E-glass or S-glass), fiberglass, nylon, polyester, carbon, aramid, plastics, polymers (e.g., thermoplastics such as polyamides (e.g., nylon), polycarbonate, polyethylene, polypropylene, polybutylene (e.g., polybutylene terephthalate), polystyrene, polyurethane, vinyl, or any combination thereof), or other materials.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A polymeric tape material coated with a coating composition including a dicarbonyl compound represented by the formula

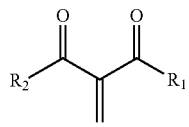

wherein the coating composition includes one or more of a diethyl, dimethyl, hexyl methyl, ethyl ethoxy ethyl, ethyl cyclohexyl, 2-phenylpropyl ethyl, dicyclohexyl, and fenchyl methyl;
wherein the coating composition has a viscosity of from about 50 cps to about 500 cps as measured according to ASTM D1084;
wherein the coating composition initiates either: (i) spontaneous polymerization (e.g., in less than about one minute) at room temperature of the coating composition without the addition of an initiator; or (ii) polymerization at room temperature at a selected later time without the addition of an initiator; and wherein the coating composition adheres the polymeric tape material to a substrate.

2. The material of claim 1, wherein the polymeric tape material comprises a structural adhesive material.

3. The material of claim 2, wherein the polymeric tape material includes at least one surface that is substantially tack-free.

4. The material of claim 1, wherein the polymeric tape material comprises an epoxy-based structural adhesive material.

5. The material of claim 4, wherein the polymeric tape material includes a reinforcing layer.

6. The material of claim 1, wherein the substrate is metallic.

7. The material of claim 6, wherein the coated polymeric tape material forms a laminate when applied to the substrate.

8. The material of claim 4, wherein one or more of the polymeric tape material and substrate are nucleophilic.

9. The material of claim 1, wherein the substrate, the polymeric tape material, or both have a pH of greater than 7.

10. The material of claim 1, wherein the polymeric tape material includes at least one surface that is tacky.

11. The material of claim 1, wherein the polymeric tape material includes at least one surface that is substantially tack-free and an opposing surface that is tacky.

12. The material of claim 1, wherein the polymeric tape material includes a film layer.

13. The material of claim 1, wherein the coating composition forms a handling film.

14. The material of claim 1, wherein the polymeric tape material includes a first surface containing a pressure sensitive adhesive formed by the coating composition and a second surface that is a heat activated adhesive.

15. The material of claim 1, wherein the coating composition forms a tack-free surface on the polymeric tape material.

16. The material of claim 1, wherein the coated polymeric tape material is de-bonded and removed from the substrate.

17. The material of claim 1, wherein the polymeric tape material is a structural adhesive and the coating composition increases dimensional stability of the adhesive.

18. The material of claim 1, wherein the polymeric tape material includes a reinforcing layer comprising a scrim, a yarn, a fiber, a bead of solid epoxy-containing material, a weave, glass fibers, a mesh, or any combination thereof.

19. The material of claim 1, wherein the polymeric tape material includes an expandable structural adhesive.

20. The material of claim 1, wherein the polymeric tape material is extruded.

* * * * *